Feb. 5, 1935.　　　　　G. BERTIN　　　　　1,990,059
TURBINE FOR ELASTIC FLUIDS ADAPTED FOR USE AS COMPRESSORS
Filed Aug. 29, 1931　　　9 Sheets-Sheet 2
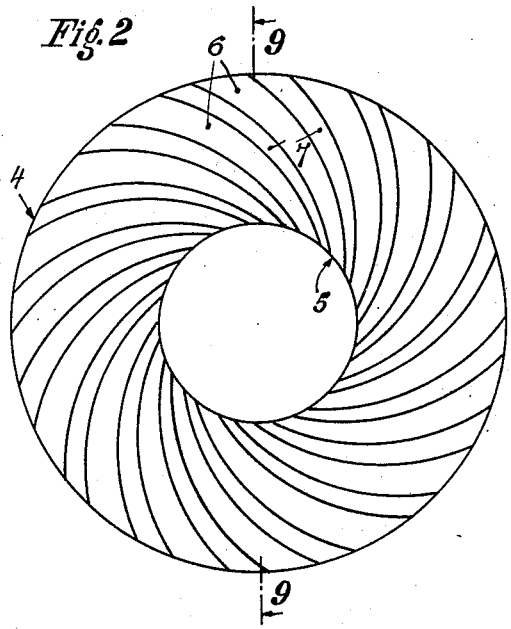
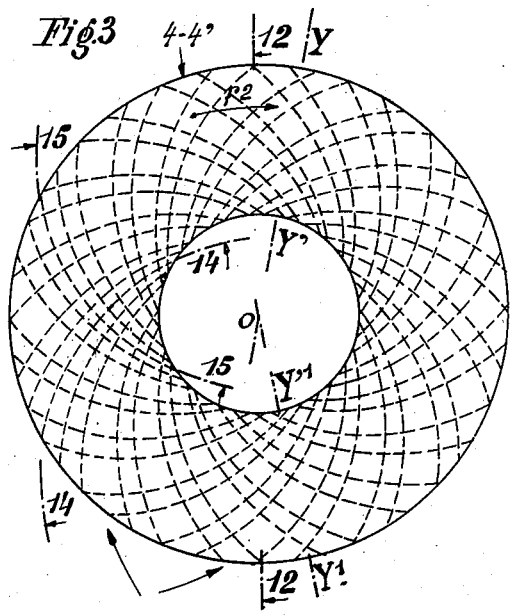
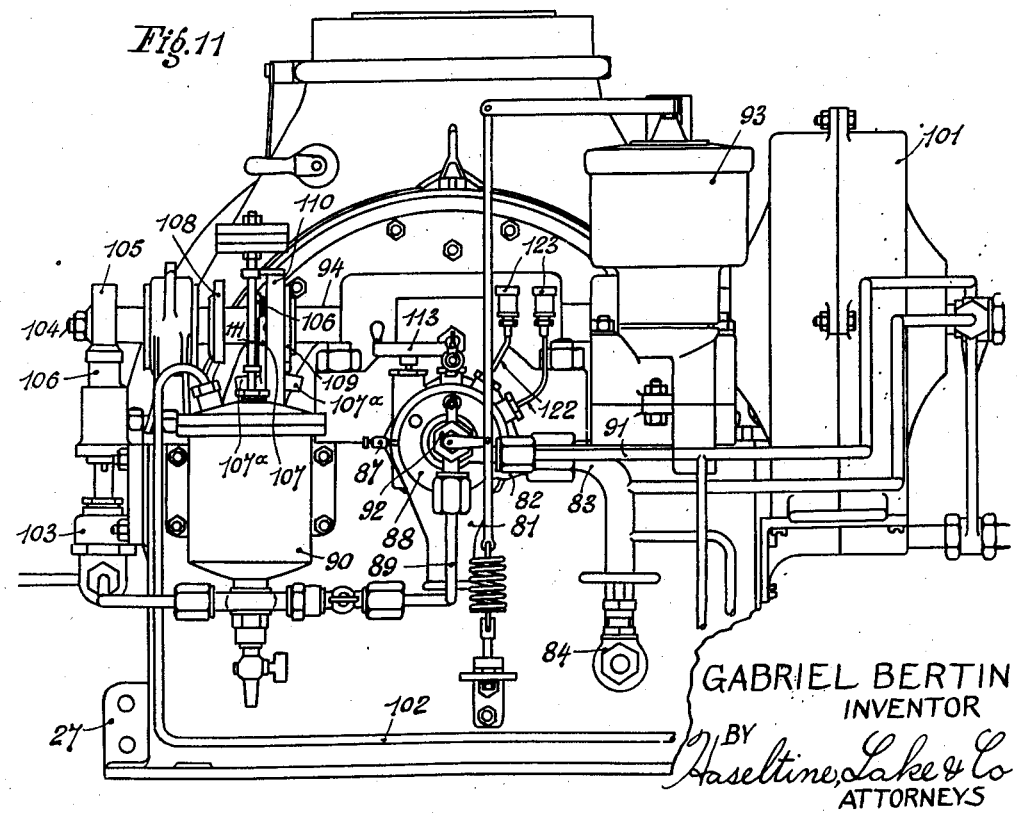
GABRIEL BERTIN
INVENTOR
BY
Haseltine, Lake & Co
ATTORNEYS Feb. 5, 1935. G. BERTIN 1,990,059
TURBINE FOR ELASTIC FLUIDS ADAPTED FOR USE AS COMPRESSORS
Filed Aug. 29, 1931 9 Sheets-Sheet 3
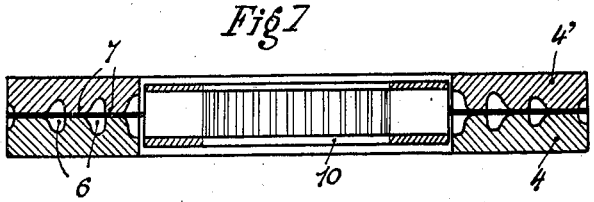
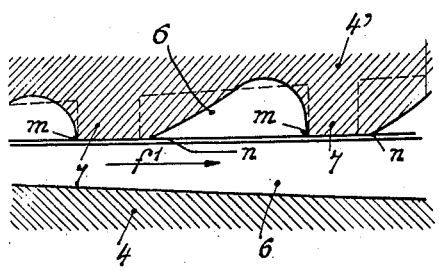
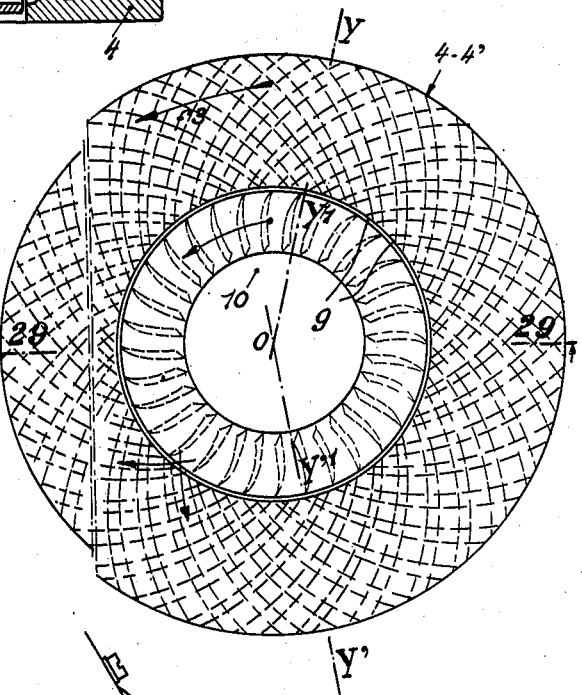
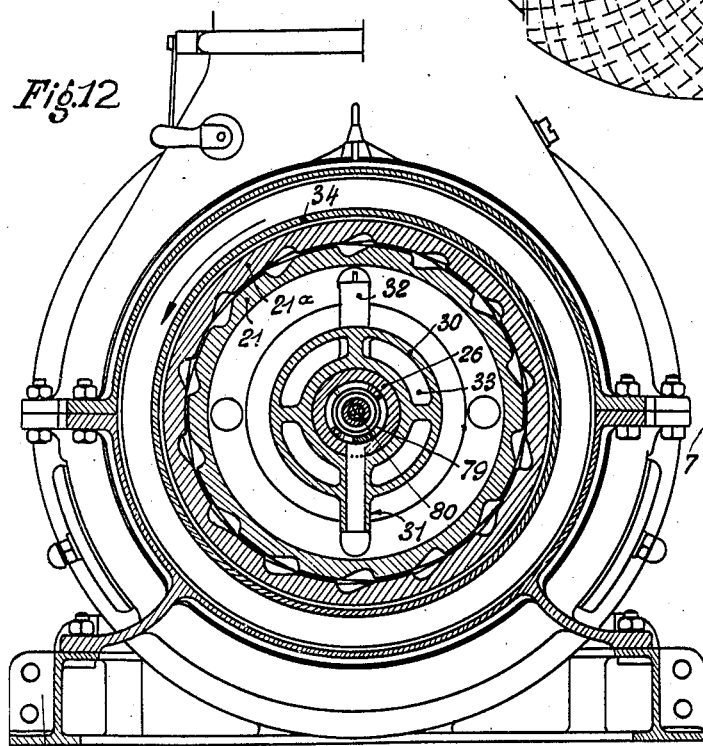
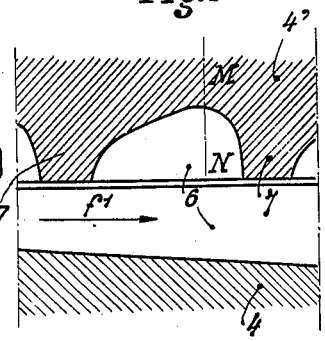
GABRIEL BERTIN
INVENTOR
BY
Haseltine, Lake & Co.
ATTORNEYS Feb. 5, 1935. G. BERTIN 1,990,059
TURBINE FOR ELASTIC FLUIDS ADAPTED FOR USE AS COMPRESSORS
Filed Aug. 29, 1931 9 Sheets-Sheet 5

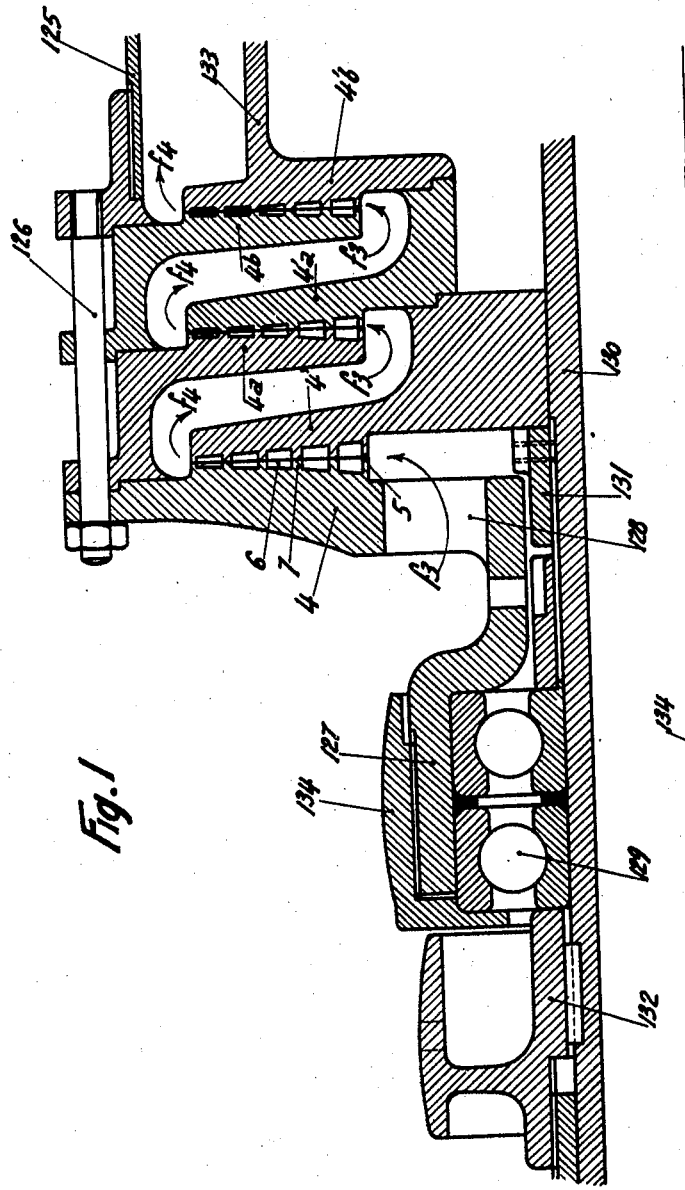

GABRIEL BERTIN~
INVENTOR

BY Haseltine, Lake & Co.,
ATTORNEYS.

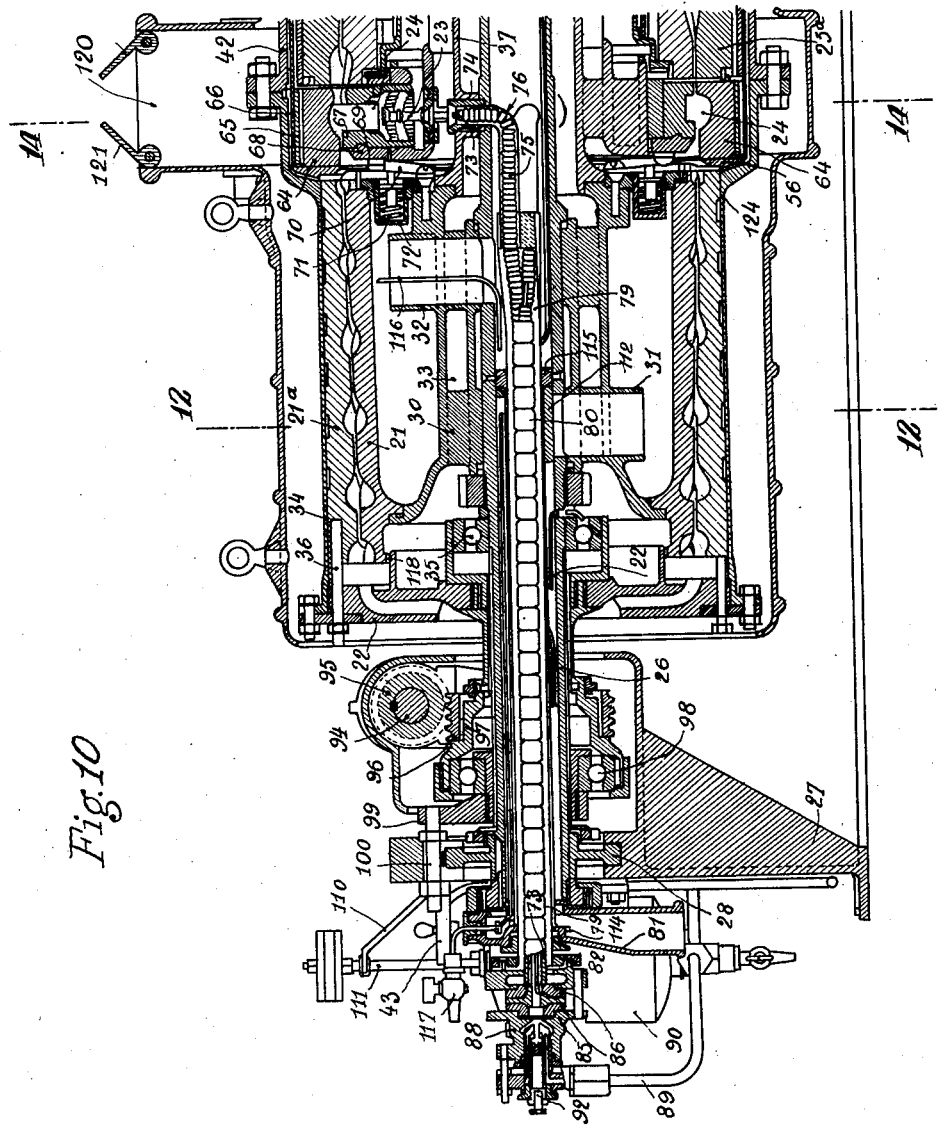

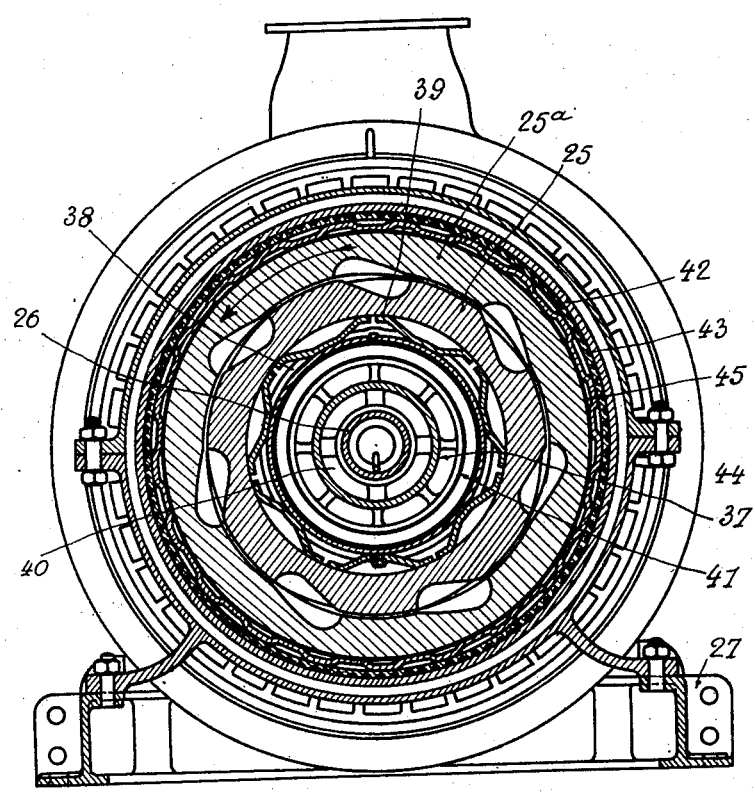

Feb. 5, 1935.　　　　　G. BERTIN　　　　1,990,059
TURBINE FOR ELASTIC FLUIDS ADAPTED FOR USE AS COMPRESSORS
Filed Aug. 29, 1931　　9 Sheets-Sheet 9
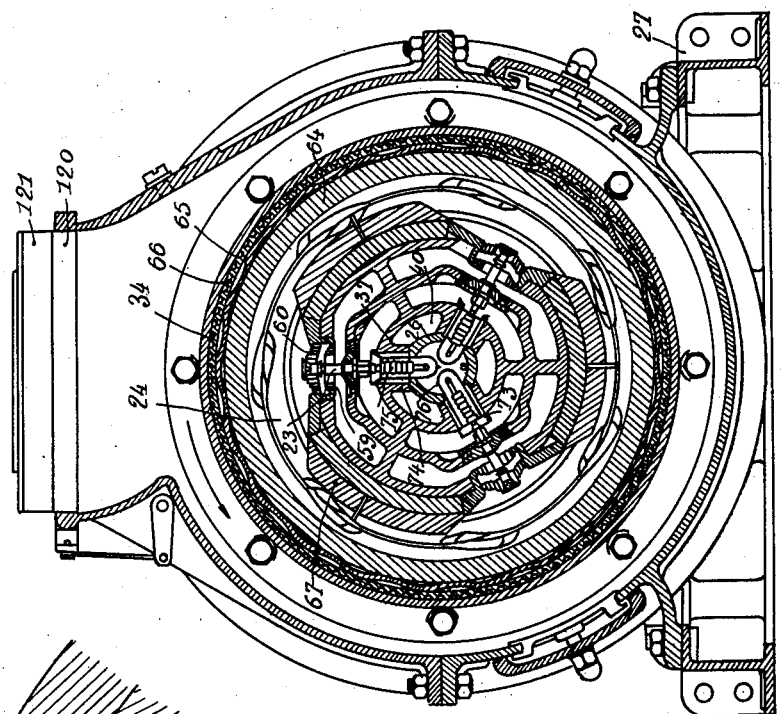
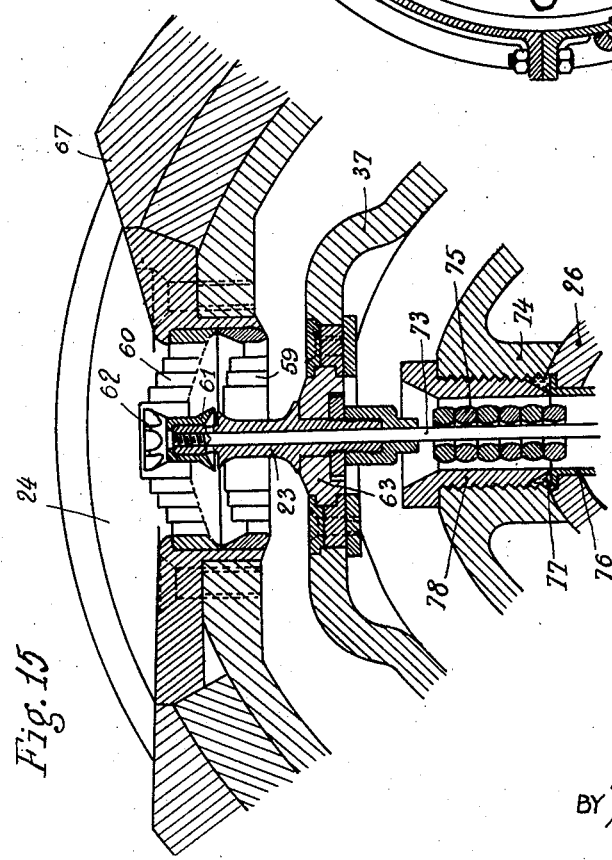
GABRIEL BERTIN –
INVENTOR
BY Haseltine, Lake & Co.,
ATTORNEYS.

Patented Feb. 5, 1935

1,990,059

UNITED STATES PATENT OFFICE 1,990,059

TURBINE FOR ELASTIC FLUIDS ADAPTED FOR USE AS COMPRESSORS

Gabriel Bertin, Paris, France

Application August 29, 1931, Serial No. 560,143
In France September 22, 1930

8 Claims. (Cl. 253—79)

The present invention refers to turbine apparatus for elastic fluids which is adapted for use as a compressor.

The main object of the invention is to provide a machine adapted to effect transformation of the energy of an elastic fluid under pressure during exchange of work without practically varying the kinetic energy. The machine may function either as turbine or compressor, in accordance with the sense of the thermo-dynamic transformation, i. e. according to whether fluid under pressure is supplied in order to cause the machine to rotate and thus produce work, or whether exterior work is applied thereto in rotating the machine in order to produce pressure.

Other characteristics of the invention will result from the following description.

In the drawings, given merely as examples:

Figure 1 is a fragmentary longitudinal section of a turbine made according to the invention and embodying the main features thereof.

Figure 2 is an elevation of one part of the machine in the form of a disc.

Figure 3 is an analogous view wherein the device has two parts in the form of a disc.

Figure 4 represents, on a larger scale, a particular section of the spiral channels or grooves of the device.

Figure 5 represents another section of such spiral channels.

Figures 6 and 7 represent an elevation, and a section along the line 29—29 of Figure 6, respectively, of a disc device of the invention, particularly applicable to the compression of fluids.

Figure 8:
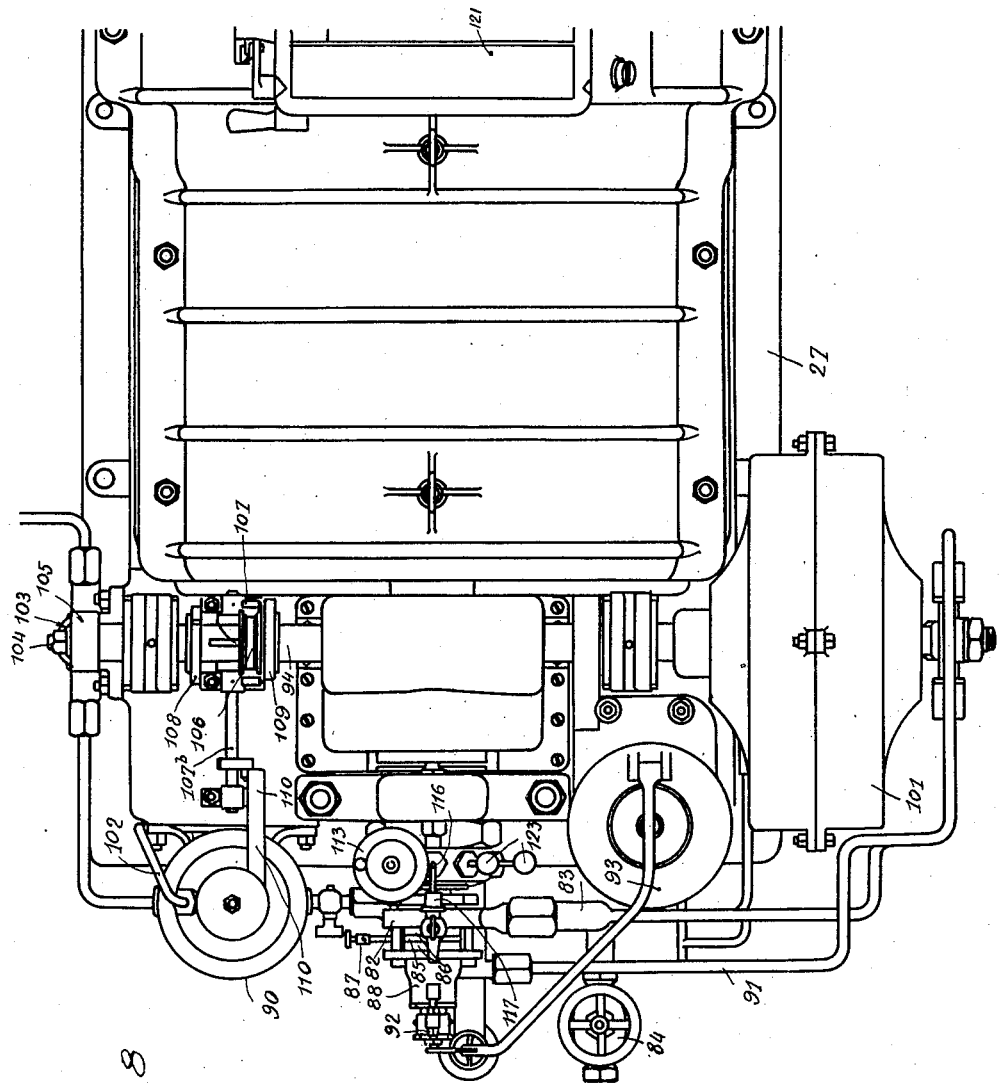
Figure 9:
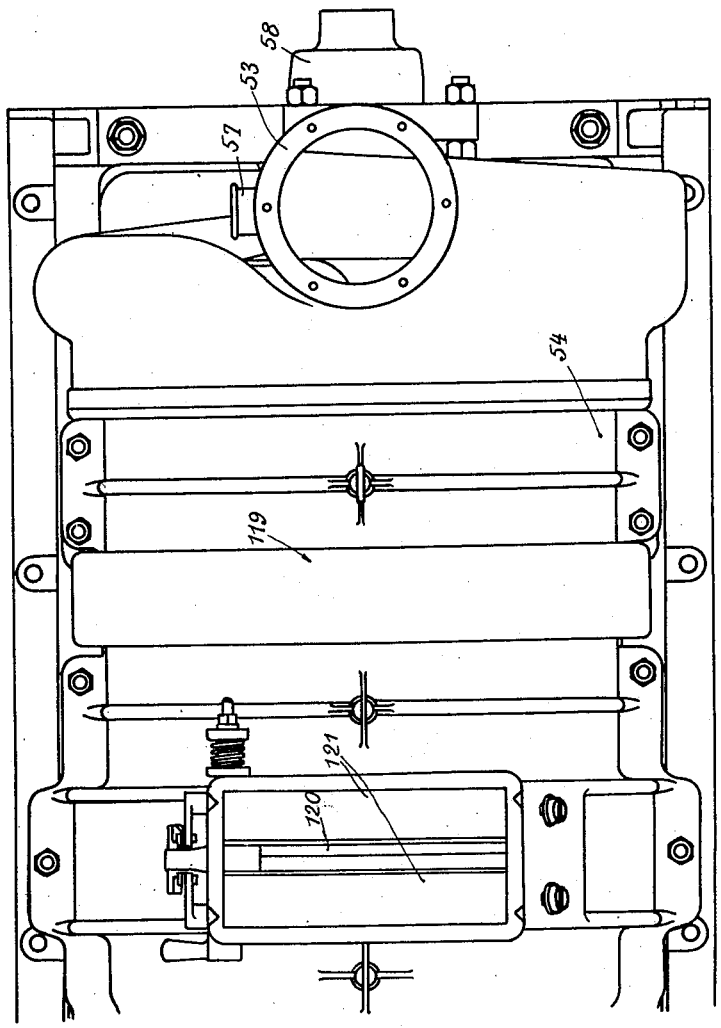

Figures 8 and 9 together represent a plan view of an internal combustion turbine embodying the device.

Figure 10A:
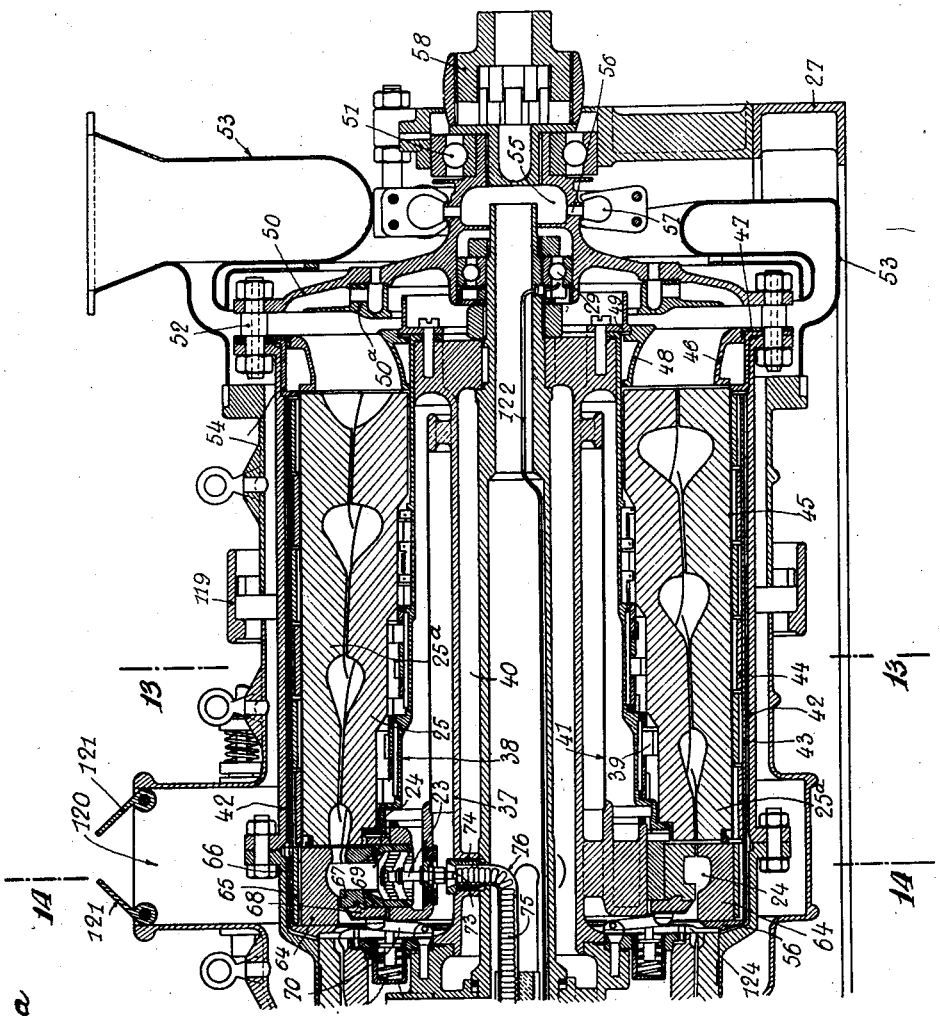

Figures 10 and 10A together represent a longitudinal section of the turbine.

Figure 11 is a side view of said turbine.

Figures 12, 13 and 14 are cross sections of the same turbine along lines 12—12, 13—13 and 14—14 respectively of Figures 10 and 10A.

Figure 15 is a large scale section of one of the burners represented in Figures 10, 10A and 14.

The invention can preferably be carried out in the manner outlined hereinafter.

Figure 1 may now be considered, and the embodiment of the radial compressor shown in this figure comprises a system of three pairs of rotors.

The first pair comprises the outer wheel 4 and the inner wheel 4', which are grooved on their surfaces to form the spiral channels 6 which have a relatively opposite course in wheels 4 and 4' respectively, while 7 denotes the walls between the spiral channels. 5 designates the central opening as in wheels 4 and 4' of Figure 2.

The wheel is rigidly arranged with the other two wheels 4a and 4b as well as with cylinder 125 due to the assembly obtained by means of studs 126. This wheel 4 is also rigid with the hub 127 due to arms 128 which connect these parts to form a single body, while within hub 127, one or several roller bearings 129 are provided for the support of this hub. The outer surface of the hub 127 is of rounded shape as at 134 and is suitable for operation by means of a belt.

The wheel 4' is rigid with the other two wheels 4'a and 4'b as well as with the tubular shaft 130 on which the wheels 4', 4'a and 4'b are mounted by means of nut 131. The tubular shaft 130 of axis 134 is held and centered by the inner face of the roller bearing 129. At the end of shaft 130, a pulley 132 is provided which is keyed thereon, to allow of operation of the three wheels 4', 4'a and 4'b by a belt.

If the wheels 4, 4a and 4b on the one hand and the wheels 4', 4'a and 4'b on the other hand are rotated in opposite directions by means of the belt driven pulley 132 and hub 127, the air drawn by each pair of wheels is moved in the direction of arrow $f3$, and the compressed air is moved in the direction of $f4$ so that the compressed air leaving the last pair of wheels 4b and 4'b is compressed into the chamber provided therefor between the cylinder 125 and wall 133 rigidly secured to wheel 4'b.

The device primarily comprises a circular disc 4 of a certain thickness, with a wide central opening 5. Spiral channels 6 are hollowed out of the one surface of disc 4 in such manner that at all points their edges form a constant angle of 45° with the radius of the disc. The depth of each of such identical channels 6 increase from the periphery to the centre (Figure 1).

Another disc 4', absolutely similar to the disc 4, is fitted on the top of the latter, axis for axis, so that the surfaces provided with spiral channels 6 are in juxtaposition with the spirals having relatively opposite courses in the discs. The result obtained is represented in Figure 3. It is to be noted that all the spiral channels 6 intersect everywhere at right angles.

In fact, if in Figure 3 the upper disc 4' is made to revolve in the direction of the arrow $f2$, relative to the lower disc 4, the points of intersection of the spiral channels 6 move from the periphery towards the centre.

The intervals 7 forming partitions between the spiral channels also move from the periphery towards the centre.

Calculation shows however that, in the carrying out of such a system, if it is desired that the gases shall move synchronously with the upper edges $m$ (Figure 4) of the intervals 7, and that their speed is but slightly greater with reference to the lower edges $n$ of those same intervals, the section of the spiral channels 6 is preferably outlined as shown in Figure 4, so that a tangent to its outline is perpedicular to the direction of the motion at $m$ (upper edge) and parallel at $n$ (lower edge). This rule can only be readily applied when it may be carried out during the manufacture, and for apparatus of relatively small size, it determines a simple rectangular shape for the same as shown in Figure 1.

Nevertheless, in cases of great differences in pressure between the extreme portions of the spiral chanels 6, the section outline represented in Figure 4 would become too cumbersome in the region where the low pressure occurs, so it is preferable to modify it progressively, on reaching that region, and to give it a bi-ellipsoidal section outline (slightly semi-ovoid in nature) as shown in Figure 5, the position of the maximum ordinates of such section outlines of equal surface remaining the same.

To simplify matters, the spiral channels 6 with sections defined by Figures 4 and 5 will be termed hereinafter "spiral grooves".

In a device such as that shown in Figures 1 and 3, which we suppose henceforth to be provided with spiral grooves 6, a great axial pressure is felt between the discs 4 and 4' arising from the pressure of the interposed gases.

In order to avoid that drawback, all that is necessary is to substitute for the even surfaces of the discs co-axial conical surfaces fitting one into the other.

To get these, an angle YOY1 (Figure 3) is traced delimiting, on the surface of the discs, a whole number of spiral grooves; the arc Y'Y'1 represents the length of the circumference of the small base of a truncated cone, the length of the circumference of the large base of which is equal to the arc YY1. The surface of the discs comprised between YY1 and Y'Y'1 is fitted around a common axis.

The two parts are fitted one into the other in a homologous manner. The spiral grooves 6 are disposed in juxtaposition and intersect at 90°. Further, one of the parts is fixed and the other can turn so that the intersections of the spiral grooves move in the direction of the increasing sections. In this way a device has been constructed analogous to the disc device and enabling the direct transformation of the pressure of the gases into useful external work. Indeed if gas under pressure is made to enter the spiral grooves 6 through their small sections and that gas travels substantially synchronously, they expand as previously in the spiral grooves of the truncated-cone-shaped parts and cause the movable part to revolve.

By reversibility, a similar device lends itself to the compression of the gases.

For preference, a centrifugal wheel (Figures 6 and 7) revolving with the moving disc 4' is fitted in the centre of the system, so as to suck the gases to be compressed and send them towards the inlet orifices of the spiral grooves 6. Such wheel 10 could be done away with, on condition that the two discs 4 and 4' with spiral grooves are made to revolve in opposite directions in respect of one another.

In order to avoid the drawback of the axial pressure exerted between the discs 4 and 4' by the pressure of the gases, it is also preferable in such case to replace the plane surfaces of the discs by co-axial conical surfaces conjugated and made in the same manner as previously.

The device thus constructed renders it possible to compress the gases, as they are driven by the centrifugal wheel 10 into the spiral grooves 6 through their large sections by the intervals 7 separating the said spiral grooves into a chamber provided for the purpose.

The compression of the gases is secured by utilizing the work required to rotate the revolving parts.

The compression pressure obtained at the outlet of the spiral grooves is adjusted for maximum efficiency of the device, so that the displacement of the gases under compression may be substantially synchronous with the displacement of the points of intersection 7 of the spiral grooves 6.

In Figures 8 to 15 the use of the device described above is represented for an internal combustion turbine. Such a turbine essentially comprises a compressor device 21 with a centrifugal wheel 22, of the invention, sending compressed air into the burners 23 where it becomes laden with fuel before entering a combustion chamber 24. Such chamber 24 is placed opposite the inlet orifices of a motor appliance 25 with spiral grooves of the invention, in which expand and work the combustion gases which are afterwards discharged outside.

The motor device 25 is made of refractory materials. In order to neutralize the centrifugal effect on said materials, it is advantageous to place the fixed portion of that device on the inside, and the moving portion on the outside, such moving portion being enclosed in a resisting jacket.

For constructional reasons, the compressor device 21, made of light alloy for example, is fitted up in the same manner.

According to the construction shown in Figures 10, 10A, the fixed parts of the engine are fitted on a fixed longitudinal shaft 26, about which the movable part revolves, shaft 26 being hollow. One of the shaft extremities is fixed in the frame 27 of the engine by means of a disc 28 with a thin radial wall preventing the shaft from being held too rigidly. At its opposite end, the fixed shaft 26 rests on a ball-bearing 29.

On said fixed shaft 26 is fitted a part 30 which supports the fixed part 21 of the compressor device with spiral grooves.

A water circulation can be set up in the part 30 and between that part and the fixed portion 21 of the compressor (Figures 10, 10A and 12), by means of a lower inlet pipe 31 and an upper outlet pipe 32 fitted in that part and connected with the inside of the fixed hollow shaft 26. Moreover, the part 30 comprises an internal annular space 33 opening out at the two extremities of the said part and allowing of an air circulation.

A steel body 34 (Figures 10, 10A and 12) contains the revolving part 21a, in a light alloy for example, of the compressor with spiral grooves. That body 34 is fixed by means of bolts to the centrifugal wheel 22 revolving around the fixed shaft 26 on a ball-bearing 35. The revolving part 21a of the compressor is fixed by bolts 36 to that wheel 22, the said bolts allowing of the axial displacement of that revolving part 21a, so as to adjust its position exactly with respect to the fixed part 21.

Next to the compressor device on the fixed shaft 26 is wedged a part 37 supporting, through the medium of a tubular part 38 and the elastic rings 39 (Figures 10, 10A and 13), the fixed portion 25 in refractory material of the motor device with "spiral grooves".

An annular space 40 is provided between the shaft 26 and the part 37. That space is open at the two ends of the part 37 and allows of the circulation of air along the shaft 26. Further, the part 37 comprises a free annular space closed by the tubular part 38 and through which the compressed air may pass, an inner baffle-plate 41 securing the circulation of that air along the parts 37 and 38.

The revolving part 25a of the motor device with spiral grooves is enclosed in a second steel body 42 fixed by means of bolts to the body 34 (Figures 10, 10A and 13). Between the body 42 and the revolving part 25a is disposed a part 43 comprising at the periphery circulation grooves for the compressed air, elastic corrugated jackets 44 and an air-tight jacket 45.

A moving annular part 46, held by a part 47 (Figures 10, 10A) covers the ends of the air-tight jacket 45 and of the body 42. Similarly, a fixed annular part 48, held by a part 49, fixed with screws for example on to parts 37 and 38, covers the ends of these latter. The exhaust gases thus pass between the annular part 46 and 48 which protect the ends of the parts covered by them from a too great rise in temperature.

A wheel 50 (Figures 10, 10A) erected on a ball-bearing 51 held in a journal of the frame 27 of the engine, is fixed by means of stay-rods for example, to the body 42. Those stays 52 provide between the body 42 and the wheel 50 a space through which pass the exhaust gases which are discharged into a volute chamber 53 (Figures 8, 9 and 10, 10A) fixed on a casing 54 protecting the rotor. The wheel 50 comprises a double wall 50a with air circulation, opposite the exhaust of the motor device 25, such double wall protecting the wheel 50 from heating by the exhaust gases and conducting those gases radially towards the volute chamber 53.

The wheel 50, through the medium of the ball-bearing 29, bears the fixed hollow shaft 26, which ends in a bearing 55 provided in the hub of that wheel. Such bearing 55 connects by means of radial orifices 56 with an exhaust volute 57 fixed on to the frame 27 and in which is ejected the cooling water that has circulated in the hollow shaft 26.

A suitable transmission means fixed on wheel 50, such as a coupling sleeve 58 for example, makes it possible to use the work developed by the turbine.

The fuel and air supply system for the turbine is placed between the compressor device 21 and the motor device 25. For that purpose, the burners 23 (three being shown in Figures 10, 10A and 14) are mounted radially in the part 37 which bears the fixed portion 25 of the motor device. Each burner 23 is formed (Figure 15) of two sets 59 and 60 of concentric shell rings between which the fuel is sent in a film by means of a small central column 23 owing to an adjustable peripheric nozzle. A castellated screw 62 surmounts the small column 23 which is insulated at its base by a part 63, so that an electric spark passing between the castellated screw 62 and the adjacent shell-ring causes the initial ignition of the fuel.

The notched screw 62 of Figure 15 is connected to the current source by means of support 23, tube 73 (shown in Figs. 15 and 10, 10A) and by flange 85 of the latter figures upon which the input terminal of Figures 8 and 9 is mounted.

The burners 23 lead into the annular combustion chamber 24, which widens out opposite the said burners. That chamber 24 is placed between the compressor device 21 and the motor device 25. It is bounded at its periphery by a part 64 (Figures 12 and 14) in refractory material fitted by means of an elastic corrugated jacket 65 on the inside of a part 66 which is in turn fixed in a bellied-out part of the body 34. That part 66 is provided at its periphery with grooves for a circulation of compressed air for cooling purposes. The elastic corrugated jacket 65 allows of compensation of the differences of expansion between the parts 64 and 66, differences due to the centrifugal force and to the temperature of those parts.

The combustion chamber is moreover bounded at the sides and internally by a fixed ring 67 (Figures 10, 10A, 14 and 15) in refractory material, formed of as many parts as there are burners (three in the example shown). Those parts 67 are assembled and held together by a refractory ring 68, by means of a conical franking 69 (Figures 10 and 10A). Levers 70 arranged around fixed axes rest on the ring 68, the said levers being acted upon by springs 71. To prevent their becoming heated, the springs 71 fit into cylindrical sockets 72, fixed in any suitable manner on to parts 21 and 30 so as to lie in the water chamber comprised between those parts.

Connected up with the base of each burner 23 (Figures 10, 10A, 14 and 15) is a fuel supply pipe 73 for that burner. That pipe 73 enters radially into the inside of the hollow shaft 26 passing through a tubular arm 74 of the part 37 bearing the burners. Each pipe 73 is provided with insulating beads 75 and fitted in a piping 76 connected up with the part 37, for example by means of a plastic joint 77 (Figure 15) clenched by a tubular bolt 78.

Inside the shaft 26, the pipes 76 join up to form a single piping 79 (Figures 10, 10A and 12) in which are placed the fuel supply pipes 73 provided with ordinary insulating beads 80. On leaving the fixed shaft 26, the piping 79 (Figures 10 and 10A) passes through a hollow part 81, open to the outside to allow the supply of cooling water to be fed into the shaft 26, and ends in a part 82 (Figures 8, 9, 10, 10A and 11) to which a pipe 83 (Figures 8, 9) is connected enabling the compressed air to be taken from the engine or to be sent to the said engine by means of a valve 84.

Valve 84 is mounted on pipe 83 of Figure 11, while pipe 83 is connected with piece 82 (Figures 8 and 9) mounted on the piping 79 (Figures 12 and 10, 10A) communicating with the interior of the machine and permitting the compressed air to circulate according to whether the valve 84 is open or closed.

On leaving the fixed shaft 26, the pipes 73 are assembled by a common flange 85 (Figures 8, 9, 10, 10A and 11) and insulated by the parts 86, a terminal 87 being fixed on that flange whereby the burners 23 may be connected electrically to appropriate electrical supply mains.

An emulsifier 88 fixed to the part 82 has its outlet in front of the flange 85, and is connected by means of piping 89 (Figures 8, 9, 10, 10A and 11) with a fuel tank 90 under pressure. Further, a pipe 91 (Figures 8, 9 and 11) for the supply of compressed air to the emulsifier 88, for emulsifying the fuel, leads into the annular space of the emulsifier. The emulsifier 88 comprises an axial shutter 92 whereby its output can be regulated. An automatic adjustment is secured from a suitable regulator 93 connected with the shutter 92 by a system of levers.

The emulsifier 88 is intended to cause an emulsion of air and combustible to be passed to the tubes 73 abutting the burners, so that the resistance encountered by the advancing combustible within the tubes which are of small diameter, is decreased. If the air pressure of the emulsion is greater than the pressure of the air compressed by the compressor of the turbine, the expansion of the air in the emulsion at the outlet of column 23 produces a more complete pulverization of the fuel.

In the example given, the supply of compressed air and fuel to the emulsifier 88 is secured automatically by means of a secondary shaft 94 (Figures 8 to 11) driven by the rotor of the engine. On shaft 94 is keyed a helicoidal pinion wheel (Figures 10, 10A) engaging with an endless screw 96. That endless screw 96 is fitted on a tubular extension 97 fixed on the hub of the centrifugal suction wheel 22 and turning on a ball-bearing serving as a footstep bearing 98, which can slide up and down on the fixed shaft 26 through the medium of a part 99, connected with the frame 27 by an adjusting screw 100.

On shaft 94 is mounted the rotor of a pump 101 (Figures 8, 9 and 11) in connection with the pipe 83 whereby it sucks in either air, compressed by the engine and coming from part 82, or compressed air coming from the outside through the valve 84. From that pump leads pipe 91 feeding compressed air to the emulsifier 88, and a pipe 102 ending in the upper part of the tank or fuel accumulator 90. The compressed air acting on the piston of that tank puts under pressure the liquid enclosed therein.

The construction of the pump is optional, however, for any reliable and known type will serve.

The compressed air may be furnished by valve 84 in a transitory manner for the purpose of starting the machine, for example, but ordinarily is always this pump 101 which provides the compressed air. The pump 101 sucks the air of compressor 21 due to piece 82 communicating with the piping 79 followed by the pipes 76 (Figures 10, 10A and 15) which communicate with the interior of the machine containing the compressed air.

The shaft 94 also controls the filling of the fuel tank 90 at the suitable time, by means of a pump 103 (Figures 8, 9 and 11) with automatic gearing and release. In the example shown an axis 104, revolving together with the shaft 94, can slide up and down inside that shaft. At the extremity of that axis 104 is keyed a cam 105 acting on the top of the plunger-stem 106 of the fuel pump 103.

The pump 103 can be thrown into gear or released, that is to say freed or not from the driving cam 105 by the sliding up and down of the axis 104 in the shaft 94, in one direction or the other. To that end, a rope pulley 106 fixed to and revolving with axis 104 can be displaced lengthwise along shaft 94 under the action of a forked tipper 107 with two lifts 107a. That tipper 107 oscillates under the action of an intermediate shaft 107b, so as to bring one of its lifts under one of the cams 108 and 109 keyed on to the shaft 94, which through the tipping of part 107, brings about the displacement of pulley 106 on the shaft 94. A cranked connecting rod 110, driven, in one direction or the other, by the rod 111 of the piston of the accumulator 90 at both ends of its stroke, governs the oscillations of the shaft 107b (Figures 8 to 11).

Consequently, according as the fuel accumulator 90 is being filled or emptied, the cam 105, which constantly revolves with the shaft 94, is either on the top of the plunger stem of the fuel pump 103 or away from that plunger-top.

The engine comprises a water circulation for cooling the stator. The cooling water circuit comprises the hollow part 81 (Figures 10, 10A and 11) through which the water is sent into the hollow shaft 26, externally to the piping 79. An oscillating shutter 112, which latter is limited by the annular joint 115 serving as a stop, and is controlled by a hand-wheel 113 (Figures 8 to 11) through the medium of an intermediate part 114, more or less closes the water-supply conduit inside the part 30. The shutter 112 makes possible the regulation of the water circulation in the chamber formed by the parts 30 and 21 of the compressor.

The discharge piping 32 enters the hollow shaft 26 beyond an annular joint 115, fixed between that shaft and the piping 79, and preventing the direct circulation of the water from one end to the other of the shaft 26. The cooling-water circuit ends in the bearing 55 of the wheel 50 where the hollow shaft enters and in the exhaust volute 57. A tube 116 (Figures 10, 10A) whose outlet is in the upper part of the space bounded by the parts 21 to 30, enables the internal air of the compressor to be exhausted for the introduction of water. That tube 116 has at its outer extremity a tap (cock) 117 (Figures 8, 9, 10 and 10A).

The heating of the engine's stator and rotor is kept down by a circulation of air.

As regards the stator, a certain amount of clearance 118 is provided between the interior lapping of the suction wheel 22 and the fixed part 21 of the compressor having the spiral grooves. The result is an escape of air which circulates in the internal annular space 33 of the part 30, then between the fixed shaft 26 and the part 37. The free space provided between the wheel 50 and the baffled part 49 and between the guiding part 48 and the double wall 54, allows the circulation air to enter and mix with the exhaust gases which it cools before leaving the turbine.

Similarly, the rotor is cooled by the atmospheric air circulating between the revolving bodies 34 and 42 and the casing 54, owing to the centrifugal effect due to the heads of the assembling bolts.

A lantern opening 119 is provided in the casing 54 near the middle of the body 42 so as to assist the entry of the air which is ejected on the one hand in the centre through the opening 120 (Figures 8, 9, 10, 10A and 14) regulated by shutters 121 the opening of which is variable at will and, on the other hand, through the exhaust volute 55 which collects the combustion gases at the same time.

The circulation of air entering through the lantern opening 119, is due to the centrifugal ejection of the air contained in the space between the nuts of the flanges of the unit located at the ends of cylinder 42. The air thus ejected by the centrifugal force in the opening 120 and in the volute 55 is replaced by the air entering the lantern opening 119.

The outer side of the wheel 50 is also cooled in the same manner. An air circulation is also set up between the stays 52 which are hollow.

Compressed air, coming from the compressor 21 having the spiral grooves is also used to prevent overheating of the engine.

In the stator, the circuit of compressed air comprises the space included between the part 37 and the baffle-plate 41, then that included between that baffle-plate and the tubular part 38. The compressed air thus insulates the central part of the turbine and protects it against a progressive increase of temperature. After circulating thus the air reaches the burners 23.

A derivation of compressed air, set up by the grooves provided in the part 65, travels around the periphery of the rotor. That diverted air circulates through the grooves of the part 43, then, at the extremity of that part, turns backwards and is baffled in the elastic corrugated jackets 44 and enters the combustion chamber 24 through the clearance left between the parts 25a and 64.

Further, the engine is provided with a suitable lubricating device for the moving parts. In particular, tubes 122 pass into the hollow shaft 26 and end at the inner bearings 29 and 35, such tubes being fitted at their ends outside the engine with a lubricator 123 (Figures 8 to 11).

The working of that turbine is as follows:

The engine is started by setting in motion the revolving part, either by means of an external force acting on the coupling sleeve 58 (Figures 10, 10A), or by forcing compressed air at an appropriate pressure through valve 84 and the hollow part 82 into the interior of the engine. The compressor device 21 is thus set in motion, and by means of the endless screw 96 and the pinion 95, drives the secondary shaft 94 which controls fuel supply pump 103 and compressed air supply pump 101.

The centrifugal wheel sucks up air which is driven to the entrance of the orifices of the spiral grooves of the compressor device 21. Compressed air is driven out at the other end of the compressor and driven radially towards the centre of the engine by a guide blade disc rim 124 and the curved side of the part 66. The compressed air goes around and along the arms of the radial levers 70, then circulates between the part 37 and the baffle-plate 41, and between that baffle-plate and the part 38 to end up at the burners 23.

At the same time, the pump 101, by means of part 82 and the piping 83, suck in the air driven out by the compressor 21 and, driving that air through the piping 102 on to the piston of the accumulator 90, puts under pressure the combustible liquid contained in that accumulator. The pump 101 injects compressed air through the piping 91 into the emulsifier 88, in order to emulsify the fuel supplied from the accumulator 90 through the piping 89, and which enters the inlet pipes 73. The fuel thus reaches the burners 23 where it saturates the compressed air supplied by the compressor device 21.

At that instant, the fuel is ignited on leaving the burners 23 by an electric spark which is produced between the castellated screw 62 and the adjacent shell-ring. The result is a great increase in volume and pressure of the gases of combustion which fill the combustion chamber 24. Those gases under pressure go to the entrance of the spiral grooves of the motor device 25, in which they work by expanding and cause the movable part 25a of that device to revolve. After having done their work, the hot gases are discharged radially towards the exterior, passing between the assembling flanges of the body 42 and of the wheel 50 and are collected in the volute 53.

The engine having acquired its normal speed, the ignition current is cut off, and combustion is produced by continuous ignition; the power developed is collected on the coupling sleeve 58.

Naturally, the invention is in no wise limited to the ways of carrying out same represented and described herein by way of examples.

Hence, variations may be resorted to, and parts may be used without others, insofar as these changes come within the scope of the following claims.

Having, now fully described my invention, I claim:—

1. In turbine apparatus for elastic fluids adapted for use as a compressor and provided with at least two coaxial adjacent members, one of which members is rotatable relatively to the other, the combination, of a substantially equal number per unit surface of spiral groove portions having progressively varying cross section formed in the adjacent opposed surfaces of said members and in one member disposed in the opposite direction to those in the other member so as to mutually intersect at a constant angle throughout, the groove portions in both members terminating in inlet and outlet portions, there being means for admitting a current of elastic fluid to the inlet portions of said groove portions and means for collecting the elastic fluid at the outlet portions of said groove portions.

2. In turbine apparatus for elastic fluids adapted for use as a compressor and provided with at least two coaxial and individually rotatable adjacent disks, the combination, of a substantially equal number per unit surface of spiral groove portions having progressively varying cross section formed in the adjacent opposed surfaces of said disks and disposed in one disk in the opposite direction to those in the other disk so as to mutually intersect at a constant angle throughout, the groove portions in both disks terminating in inlet and outlet portions, there being means for admitting a current of elastic fluid to the inlet portions of said groove portions and means for collecting the elastic fluid at the outlet portions of said groove portions.

3. In a turbine apparatus for elastic fluids adapted for use as a compressor and provided with at least two coaxial and individually rotatable adjacent conical members, the combination, of a substantially equal number per unit surface of spiral groove portions having progressively varying cross section formed in the adjacent opposed surfaces of said conical members and disposed in one conical member in the opposite direction to those in the other conical member so as to mutually intersect at a constant angle throughout, the groove portions in both conical members terminating in inlet and outlet portions, there being means for admitting a current of elastic fluid to the inlet portions of said groove portions and means for collecting the elastic fluid at the outlet portions of said groove portions.

4. In turbine apparatus for elastic fluids adapted for use as a compressor and provided with at least two coaxial and individually revoluble adjacent members, the combination, of a substantially equal number per unit surface of spiral groove portions having progressively varying cross section formed in the adjacent opposed surfaces of said members and in one member both disposed in the opposite direction to those in the other member so as to mutually intersect at a constant angle throughout, and individually having a cross section profile which is approximately tangent upon one side of the same to the active driving surface of the member in which it is cut and approximately perpendicular to the same surface upon the other side, the groove portions in both members terminating in inlet and outlet portions, there being means for admitting a current of elastic fluid to the inlet portions of said groove portions and means for collecting the elastic fluid at the outlet portions of said groove portions.

5. In turbine apparatus for elastic fluids adapted for use as a compressor and provided with at least two coaxial and individually revoluble adjacent members, the combination, of a substantially equal number per unit surface of spiral groove portions having progressively varying cross section formed in the adjacent opposed surfaces of said members and in one member disposed in the opposite direction to those in the other member and mutually intersecting at a constant angle of about 90° throughout, the groove portions in both members terminating in inlet and outlet portions, there being means for admitting a current of elastic fluid to the inlet portions of said groove portions and means for collecting the elastic fluid at the outlet portions of said groove portions.

6. In turbine apparatus for elastic fluids adapted for use as a compressor and provided with at least two coaxial and individually revoluble adjacent members, the combination, of a substantially equal number per unit surface of spiral groove portions having progressively varying cross section formed in the adjacent opposed surfaces of said member and in one member disposed in the opposite direction to those in the other member so as to mutually intersect at a constant angle throughout, each of which groove portions has an enlarged outline at the end thereof having maximum cross section, the groove portions in both members terminating in inlet and outlet portions, there being means for admitting a current of elastic fluid to the inlet portions of said groove portions and means for collecting the elastic fluid at the outlet portions of said groove portions.

7. In turbine apparatus for elastic fluids adapted for use as a compressor and provided with at least two coaxial adjacent members, one of which members is fixedly mounted while the other member is rotatably and exteriorly mounted with respect to said fixedly mounted member, the combination, of a substantially equal number per unit surface of spiral groove portions having progressively varying cross section formed in the adjacent opposed surfaces of said members and in one member disposed in the opposite direction to those in the other member so as to mutually intersect at a constant angle throughout, the groove portions in both members terminating in inlet and outlet portions, there being means for admitting a current of elastic fluid to the inlet portions of said groove portions and means for collecting the elastic fluid at the outlet portions of said groove portions.

8. In turbine apparatus for elastic fluids adapted for use as a compressor and provided with at least two coaxial and individually revoluble adjacent members, one of which members is fixedly mounted, while the other member is rotably mounted with respect thereto, the combination, of a substantially equal number per unit surface of spiral groove portions having progressively varying cross section formed in the adjacent opposed surfaces of said members and in one member disposed in the opposite direction to those in the other member so as to mutually intersect at a constant angle throughout, the groove portions in both members terminating in inlet and outlet portions, there being means for admitting a current of elastic fluid to the inlet portions of said groove portions and means for collecting the elastice fluid at the outer portions of said groove portions.

GABRIEL BERTIN.